United States Patent
Li

(10) Patent No.: US 12,443,355 B2
(45) Date of Patent: Oct. 14, 2025

(54) DATA STORAGE METHODS, APPARATUSES, DEVICES, AND STORAGE MEDIA

(71) Applicant: ALIPAY (HANGZHOU) INFORMATION TECHNOLOGY CO., LTD., Zhejiang (CN)

(72) Inventor: Mengyu Li, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/489,446

(22) Filed: Oct. 18, 2023

(65) Prior Publication Data

US 2024/0126465 A1    Apr. 18, 2024

(30) Foreign Application Priority Data

Oct. 18, 2022   (CN) .......................... 202211274661.4

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC ...... G06F 3/0604; G06F 3/064; G06F 3/0608; G06F 3/0665; G06F 3/0616; G06F 3/0656; G06F 3/0659; G06F 3/0679; G06F 3/0643; G06F 3/067; G06F 3/06; G06F 3/0647; G06F 3/061; G06F 3/0644; G06F 17/302; G06F 17/30091; G06F 17/30; G06F 11/01
See application file for complete search history.

(56) References Cited

U.S. PATENT DOCUMENTS

| | | | | |
|---|---|---|---|---|
| 2003/0159015 A1* | 8/2003 | Tamatsu | ............. | G06F 16/9017 707/E17.037 |
| 2017/0351551 A1* | 12/2017 | Manhardt | ............. | G06F 9/5066 |
| 2019/0147066 A1* | 5/2019 | Ben Dayan | ........... | G06F 3/0604 711/100 |

(Continued)

FOREIGN PATENT DOCUMENTS

CN    103914462 A * 7/2014 ............. G06F 17/30

OTHER PUBLICATIONS

Actionsky.com [online], "Technical Analysis, MySQL TEXT filed," Feb. 26, 2020, retrieved on Feb. 2, 2024, retrieved from URL<https://opensource.actionsky.com/20200226-mysql/>, 13 pages (with English machine translation).

(Continued)

*Primary Examiner* — Tracy C Chan
(74) *Attorney, Agent, or Firm* — Fish & Richardson P.C.

(57) ABSTRACT

This specification discloses data storage methods, apparatuses, devices, and storage media. One method comprises receiving data to be stored, wherein the data comprise data corresponding to a plurality of fields, determining whether a size of the data exceeds a predetermined threshold, and in response to determining that the size of the data exceeds the predetermined threshold: splitting a portion of the data to obtain data blocks, determining block identifiers of the data blocks based on a sequence of the data blocks, storing a data identifier of the data and the block identifiers of the data blocks that correspond to each other, and storing the block identifiers and the data blocks that correspond to each other.

15 Claims, 4 Drawing Sheets

(56) References Cited

U.S. PATENT DOCUMENTS

2023/0145054 A1* 5/2023 VanBenschoten .......................... G06F 16/2379
707/620

OTHER PUBLICATIONS

Cnblogs.com [online], "MySQL databases, variable-length strings and fixed-length strings," May 30, 2018, retrieved on Feb. 2, 2024, retrieved from URL<https://www.cnblogs.com/yfafa/p/9111661.html>, 3 pages (with English machine translation).

Pingcap.com [online], ""String type,"" available on or before Oct. 22, 2020, via Internet Archive:Wayback Machine URL<https://web.archive.org/web/20240000000000*/https://docs.pingcap.com/zh/tidb/dev/data-type-string>, retrieved on Feb. 2, 2024, URL<https://docs.pingcap.com/zh/tidb/dev/data-type-string>, 8 pages (with English machine translation).

* cited by examiner

Key: 1111 user        value: user name: Zhang San, user age: 18, user remark: 2047

Key: 1111 user 0        value: like eating watermelon

⋮

Key: 1111 user 2047        value: have won a school-level honor

FIG. 2

DATA STORAGE METHODS, APPARATUSES, DEVICES, AND STORAGE MEDIA

CROSS-REFERENCE TO RELATED APPLICATIONS

This specification claims priority to Chinese Patent Application No. 202211274661.4, filed on Oct. 18, 2022, which is hereby incorporated by reference in its entirety.

TECHNICAL FIELD

This specification relates to the field of database technologies, and in particular, to data storage methods, apparatuses, devices, and storage media.

BACKGROUND

A graph database is a database widely used at present. A dependency relationship between entities can be stored in the graph database, and data query can be performed based on the stored dependency relationship between entities, thereby improving data query efficiency.

However, the current graph database cannot support storage of larger data.

SUMMARY

This specification provides data storage methods, apparatuses, devices, and storage media, so as to partially alleviate a problem in a conventional technology.

The following technical solutions are used in this specification:

This specification provides a data storage method, including: receiving to-be-stored data, where the to-be-stored data include data corresponding to a plurality of fields; determining whether a size of the to-be-stored data exceeds a predetermined threshold; in response to that the size of the to-be-stored data exceeds the predetermined threshold, splitting some data included in the to-be-stored data to obtain data blocks; determining block identifiers of the data blocks based on a sequence of the data blocks in the to-be-stored data; and correspondingly storing a data identifier of the to-be-stored data and the block identifiers of the data blocks, and correspondingly storing the block identifiers and the data blocks.

Optionally, splitting some data included in the to-be-stored data to obtain data blocks specifically includes: determining a target field from the fields included in the to-be-stored data; and splitting data corresponding to the target field to obtain the data blocks.

Optionally, determining block identifiers of the data blocks based on a sequence of the data blocks in the to-be-stored data specifically includes: determining a block sequence number corresponding to each data block based on the sequence of the data blocks in the to-be-stored data; and for each data block, determining a block identifier of the data block based on the block sequence number of the data block and the data identifier of the to-be-stored data.

Optionally, correspondingly storing a data identifier of the to-be-stored data and the block identifiers of the data blocks specifically includes: using the data identifier of the to-be-stored data as a key, and using a value range of the block identifiers of the data blocks as a value for corresponding storage; and the correspondingly storing the block identifiers and the data blocks specifically includes: for each data block, using a block identifier corresponding to the data block as a key, and using the data block as a value for corresponding storage.

Optionally, the method further includes: receiving a query request for querying data corresponding to a specified field; determining whether the specified field is the target field; in response to that the specified field is the target field, identifying, based on the data identifier included in the query request, a block identifier corresponding to the data identifier from the graph database as a target block identifier; and identifying a data block corresponding to the target block identifier, and identifying the data corresponding to the specified field based on the identified data block.

Optionally, the method further includes: receiving a data adding request, where the data adding request is used to add data to the fields included in the to-be-stored data; generating a to-be-added data block based on the to-be-added data included in the data adding request; identifying, based on the data identifier included in the data adding request, a block identifier corresponding to the data identifier from the graph database; determining a block identifier of the to-be-added data block based on the identified block identifier; and correspondingly storing the data identifier and the block identifier of the to-be-added data block, and correspondingly storing the block identifier of the to-be-added data block and the to-be-added data block.

This specification provides a data storage apparatus, including: a receiving module, configured to receive to-be-stored data, where the to-be-stored data include data corresponding to a plurality of fields; a judgment module, configured to determine whether a size of the to-be-stored data exceeds a predetermined threshold; a splitting module, configured to: in response to that the size of the to-be-stored data exceeds the predetermined threshold, split some data included in the to-be-stored data to obtain data blocks; a determination module, configured to determine block identifiers of the data blocks based on a sequence of the data blocks in the to-be-stored data; and a storage module, configured to correspondingly store a data identifier of the to-be-stored data and the block identifiers of the data blocks, and correspondingly store the block identifiers and the data blocks.

Optionally, the splitting module is specifically configured to determine a target field from the fields included in the to-be-stored data; and split data corresponding to the target field to obtain the data blocks.

Optionally, the determination module is specifically configured to determine a block sequence number corresponding to each data block based on the sequence of the data blocks in the to-be-stored data; and for each data block, determine a block identifier of the data block based on the block sequence number of the data block and the data identifier of the to-be-stored data.

Optionally, the storage module is specifically configured to use the data identifier of the to-be-stored data as a key, and use a value range of the block identifiers of the data blocks as a value for corresponding storage; and for each data block, use a block identifier corresponding to the data block as a key, and use the data block as a value for corresponding storage.

Optionally, the apparatus further includes a query module; the query module is specifically configured to receive a query request for querying data corresponding to a specified field; determine whether the specified field is the target field; in response to that the specified field is the target field, identify, based on the data identifier included in the query request, a block identifier corresponding to the data identifier from the graph database as a target block identifier; and identify a data block corresponding to the target block identifier, and identify the data corresponding to the specified field based on the identified data block.

Optionally, the apparatus further includes an adding module; the adding module is specifically configured to receive a data adding request, where the data adding request is used to add data to the fields included in the to-be-stored data; generate a to-be-added data block based on the to-be-added data included in the data adding request; identify, based on the data identifier included in the data adding request, a block identifier corresponding to the data identifier from the graph database; determine a block identifier of the to-be-added data block based on the identified block identifier; and correspondingly store the data identifier and the block identifier of the to-be-added data block, and correspondingly store the block identifier of the to-be-added data block and the to-be-added data block.

This specification provides a computer-readable storage medium, where the storage medium stores a computer program, and the computer program is executed by a processor to implement the above-mentioned data storage method.

This specification provides an electronic device, including a memory, a processor, and a computer program that is stored in the memory and that can run on the processor, where the processor executes the program to implement the above-mentioned data storage method.

At least one of the above-mentioned technical solutions used in this specification can achieve the following beneficial effects:

In the data storage method provided in this specification, first, to-be-stored data are received, where the to-be-stored data include data corresponding to a plurality of fields; it is determined whether a size of the to-be-stored data exceeds a predetermined threshold; in response to that the size of the to-be-stored data exceeds the predetermined threshold, some data included in the to-be-stored data are split to obtain data blocks; block identifiers of the data blocks are determined based on a sequence of the data blocks in the to-be-stored data; and a data identifier of the to-be-stored data and the block identifiers of the data blocks are correspondingly stored, and the block identifiers and the data blocks are correspondingly stored.

It can be understood from the above-mentioned method that, to-be-stored data whose data size exceeds a predetermined threshold can be split, and block identifiers of data blocks obtained through splitting and an identifier of the to-be-stored data are correspondingly stored, thereby storing the to-be-stored data in a graph database.

BRIEF DESCRIPTION OF DRAWINGS

The accompanying drawings described here are intended to provide a further understanding of this specification, and constitute a part of this specification. Some example embodiments of this specification and the descriptions of the example embodiments are intended to explain this specification, and do not constitute an undue limitation on this specification. In the accompanying drawings:

FIG. 2 is a schematic diagram illustrating a key-value pair corresponding to to-be-stored data, according to this specification;

DESCRIPTION OF EMBODIMENTS

To make the objectives, technical solutions, and advantages of this specification clearer, the following clearly and comprehensively describes the technical solutions of this specification with reference to some specific embodiments and corresponding accompanying drawings of this specification. Clearly, the described embodiments are merely some but not all of embodiments of this specification. All other embodiments obtained by a person of ordinary skill in the art based on some embodiments of this specification without creative efforts shall fall within the protection scope of this specification.

The following describes in detail the technical solutions provided in some embodiments of this specification with reference to the accompanying drawings.

Figure 1:
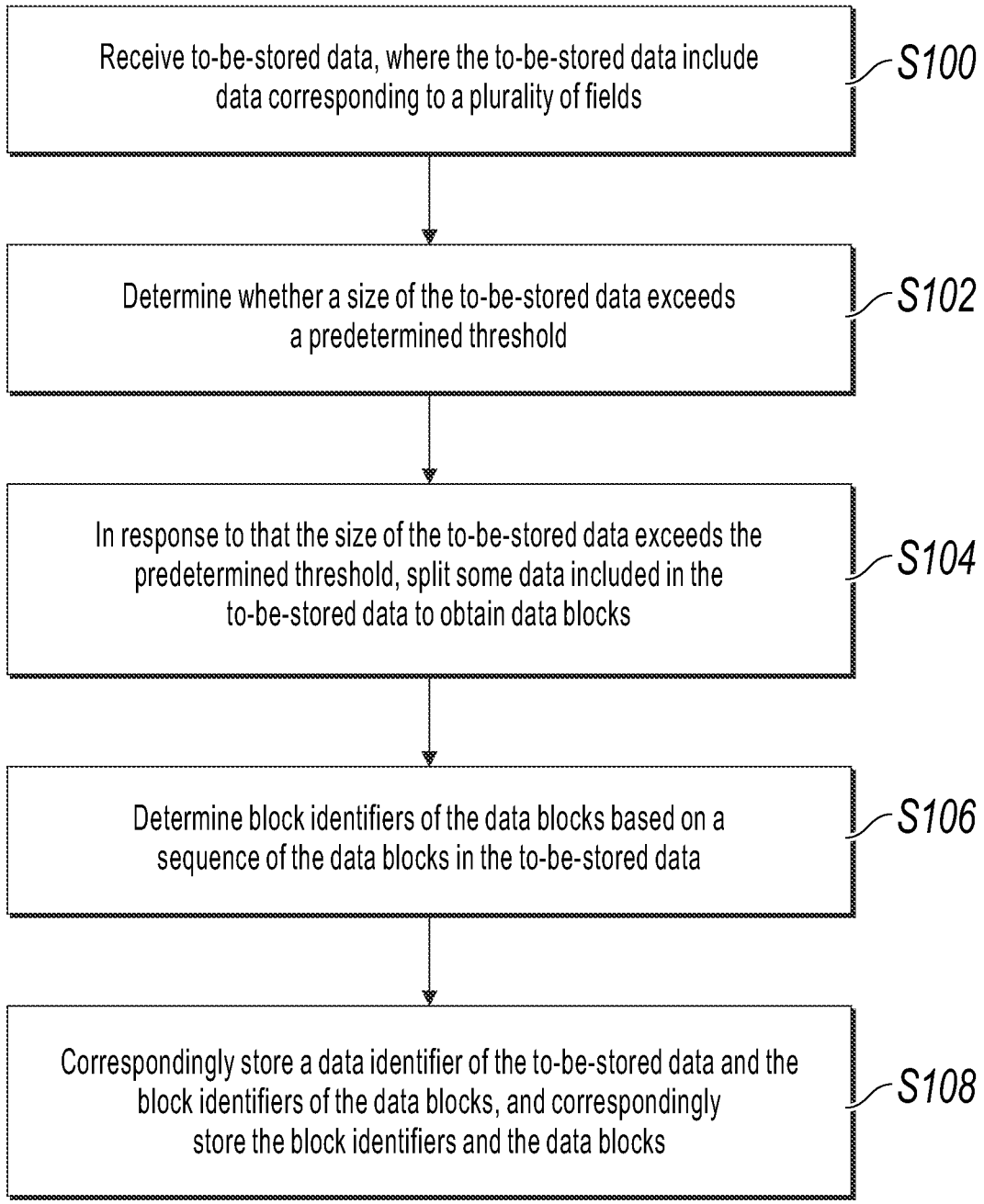
FIG. 1 is a schematic flowchart illustrating a data storage method, according to this specification.

FIG. 1 is a schematic flowchart illustrating a data storage method, according to this specification. The method includes the following steps:

S100: Receive to-be-stored data, where the to-be-stored data include data corresponding to a plurality of fields.

In this specification, a user can store data in a graph database by using a predetermined operation instruction. Before such an operation, the user can upload the data to a service platform, such that the service platform can store data that users need to store to the graph database.

Specifically, the service platform can receive, as to-be-stored data, the data that are uploaded by the user and that need to be stored in the graph database, and can further store the to-be-stored data in the graph database, where the to-be-stored data here include the data corresponding to the plurality of fields. The field here refers to a variable corresponding to an attribute of a class (the class is a set of features used to describe a type of thing). For example, a user class has attributes such as a user name, a user code, a user age, and a user address. Each attribute corresponds to one field, for example, the user name is one field and the user code is one field.

In this specification, an execution body of a method for implementing data storage can be a specified device such as a server disposed on the service platform, or can be a terminal device such as a desktop computer or a notebook computer. For ease of description, the following describes the data storage method provided in this specification by using only an example in which the server is the execution body.

S102: Determine whether a size of the to-be-stored data exceeds a predetermined threshold.

S104: In response to that the size of the to-be-stored data exceeds the predetermined threshold, split some data included in the to-be-stored data to obtain data blocks.

In this specification, after receiving the to-be-stored data uploaded by the user, the server can determine whether the size of the to-be-stored data exceeds the predetermined threshold. In response to determining that the size of the to-be-stored data exceeds the predetermined threshold, the server can split some data included in the to-be-stored data to obtain the data blocks, where the threshold here can be a value greater than a size of 4 GB.

Specifically, the server can determine a target field from the fields included in the to-be-stored data, and can further split data corresponding to the target field based on a specified data size to obtain the data blocks. For example, it is assumed that the target field is a remark of the user, and the data corresponding to the target field are "like eating apples, want to travel, like music". The remark can be split into three data blocks: "like eating apples", "want to travel", and "like music".

It is worthwhile to note that in the graph database, since methods for extracting a number and a string are different, to facilitate data management, the graph database uses the Schema to define a type of data of different fields, i.e., a data type. For example, since the user name field generally includes a group of strings, the char type can be used. The char type is a data type used to store a character (for example, 'a'). For another example, since the user age field generally includes a number, the int type can be used for storage. The int type is a data type used to store an integer number (for example, 128).

However, among the data types, there is a data type TEXT. Such a data type is a variable-length data type, i.e., a size of an occupied memory can be changed based on an amount of data input by the user. Therefore, a field of the TEXT data type can be used to store larger data. However, the int and char are fixed memory sizes, and content occupied by fields of the int and char data types is usually small. Therefore, during defining a data type of a field, if a size of data that need to be stored in the field cannot be clearly determined, the field can be defined by using the TEXT data type.

On this basis, the above-mentioned target field can be a field of a specified data type. The specified data type here can be a data type corresponding to data that may occupy a larger memory, such as TEXT, TinyTEXT, MediumTEXT, and LongTEXT.

Further, the server can determine, for each field included in the to-be-stored data, whether a data type corresponding to the field is a specified data type. In response to that the data type corresponding to the field is a specified data type, the server can use the field as the target field. For example, it is assumed that the to-be-stored data include the following fields: the user name, the user code, the user age, and the user remark. Since the user remark field may store larger data, and the user remark needs to be added continuously based on actual needs, the server can set the data type of the field to TEXT, and can determine the user remark field as the target field.

After determining the target field, the server can split the data stored in the target field based on a specified data size to obtain the data blocks.

For example, it is assumed that a size of data stored in the target field of the to-be-stored data is 4 GB, and the specified data size can be 2 MB such that the to-be-stored data can be split per 2 MB to obtain 2048 data blocks.

S106: Determine block identifiers of the data blocks based on a sequence of the data blocks in the to-be-stored data.

Further, the server can determine a block sequence number corresponding to each data block based on the sequence of the data blocks in the to-be-stored data; and for each data block, determine a block identifier of the data block based on the block sequence number of the data block and the data identifier of the to-be-stored data.

For example, it is assumed that the data stored in the target field of the to-be-stored data can be split into 2048 data blocks, and it is assumed that the data identifier of the to-be-stored data is 1111 user, where "1111" is a unique identifier of the to-be-stored data and "user" is a class name corresponding to the to-be-stored data. Among the data blocks, a block sequence number corresponding to the first data block can be 0, and a block sequence number corresponding to the last data block can be 2047, and so on. Further, based on the block sequence number corresponding to each data block and the data identifier of the to-be-stored data, the server can determine that a block identifier of the first data block is "1111 user 0", and a block identifier of the last data block is "1111 user 2047".

S108: Correspondingly store a data identifier of the to-be-stored data and the block identifiers of the data blocks, and correspondingly store the block identifiers and the data blocks.

Further, the server can correspondingly store a data identifier of the to-be-stored data and the block identifiers of the data blocks, and correspondingly store the block identifiers and the data blocks.

Specifically, the server can use the data identifier of the to-be-stored data as a key in a key-value pair, and use a value range of the block identifier of each data block as a value of the key-value pair for corresponding storage. For example, it is assumed that the to-be-stored data correspond to 2048 data blocks. In such case, the server can determine that a value range of the block identifiers of the data blocks is 0 to 2047, and further can use 0 to 2047 as the value of the key-value pair for corresponding storage. Alternatively, the value 2047 can be directly stored to represent the value range of 0 to 2047.

It is worthwhile to note that, in the above-mentioned content, the value range of the block identifier of each data block is stored as some but not all key values in the key-value pair, as shown in FIG. 2.

FIG. 2 is a schematic diagram illustrating a key-value pair corresponding to to-be-stored data, according to this specification.

It can be seen from FIG. 2 that the to-be-stored data include the following fields: the user name, the user age, and the user remark. Each field is stored in a form of "field name: field value" in a key-value pair corresponding to the to-be-stored data. To be specific, the key in the key-value pair corresponding to the to-be-stored data in FIG. 2 is "1111 user", and the value in the key-value pair corresponding to the to-be-stored data is "user name: Zhang San, user age: 18, user remark: 2047". Here, "user name" is a field name and "Zhang San" is a field value. The above-mentioned value range of the block identifier of each data block is stored as a field value corresponding to the "user remark" field. In other words, the field value corresponding to the field name "user remark" is "2047".

Further, for each data block, the server can use a block identifier corresponding to the data block as a key of the key-value pair, and use the data block as a value of the key-value pair for corresponding storage. For example, in FIG. 2, the key of the key-value pair corresponding to the first data block is "1111 user 0", the value of the key-value pair corresponding to the first data block is "like eating watermelon", the key of the key-value pair corresponding to the last data block is "1111 user 2047", and the value of the key-value pair corresponding to the last data block is "have won a school-level honor".

In addition, in the database, to preserve persistence and atomicity of operations such as adding, deleting, modifying, and querying data stored in the database, before the operations such as adding, deleting, modifying, and querying the data stored in the database are performed, the operations such as adding, deleting, modifying, and querying need to be first recorded in a write ahead log (WAL) provided by the database. As such, when a device is suddenly powered off and another abnormality occurs, the data stored in the database can be restored based on the WAL log.

On this basis, for each storage operation for storing a key-value pair, the server can further generate and store log information corresponding to the storage operation. If an abnormality occurs in the graph database after storage of the to-be-stored data is completed, the server can restore the data stored in each key-value pair based on the stored log information.

Further, the server can further receive a query request for querying data corresponding to a specified field, and determine whether the specified field is the target field. In response to that the specified field is the target field, the server can identify, based on the data identifier included in the query request, a block identifier corresponding to the data identifier from the graph database as a target block identifier; and identify a data block corresponding to the target block identifier, and identify the data corresponding to the specified field based on the identified data block.

Further, after identifying a data block corresponding to a target block identifier, the server can further receive an update operation instruction of the user, and update the identified data block. Specifically, the server can generate a new data block based on new data included in the received update operation instruction, and replace the identified data block corresponding to the target block identifier of the user with the new data block, thereby completing data update.

In practice, the user may supplement the data in the target field again within a period of time after the to-be-stored data are stored. Therefore, the server can further receive a data adding request (the adding request here is used to add data to a field included in the to-be-stored data) sent by the user; generate a to-be-added data block based on to-be-added data included in the data adding request; identify, based on the data identifier included in the data adding request, a block identifier corresponding to the data identifier from the graph database; determine a block identifier of the to-be-added data block based on the identified block identifier (for example, it is assumed that the identified block identifier is 2047, and it can be determined that the block identifier of the to-be-added data block is 2048); and correspondingly store the data identifier and the block identifier of the to-be-added data block, and correspondingly store the block identifier of the to-be-added data block and the to-be-added data block.

It is worthwhile to note that when the data adding request is used to add data to another field except the target field, the data that need to be added can be directly added after original data of the field. Alternatively, the original data of the field can be split into data blocks by using the above-mentioned method, and the data that need to be added can be a to-be-added data block, and added among the data blocks that are obtained by splitting the original data of the field.

In addition, in practice, a data transmission environment in which the user is located may encounter some abnormalities such as instability of a network environment. In such case, when the user uploads to-be-stored data of a relatively larger size at one single time, the upload may fail because of the instability of a network environment. Each time the user fails to upload, the user needs to upload all the to-be-stored data again, thereby degrading user experience.

On this basis, during data storage by using the above-mentioned method, the server allows the user to split the to-be-stored data that need to be uploaded into some pieces of small to-be-stored data for uploading. When receiving the small to-be-stored data uploaded by the user, the server can store each piece of small to-be-stored data by using the above-mentioned method, thereby achieving a resumable transfer effect.

It can be understood from the above-mentioned content that, the server can split a field with a relatively larger data size in to-be-stored data that are input by the user, to obtain data blocks. As such, data blocks can be stored, thereby implementing storage of data of a larger size. In addition, resumable transfer can be supported, thereby avoiding a problem that uploading of to-be-stored data by the user in an unstable network environment is interrupted intermittently, causing a failure to upload the to-be-stored data. Moreover, after the user has already stored the data, appended data can be additionally stored based on actual needs of the user.

The data storage method provided in one or more embodiments of this specification has been described above. Based on the same idea, this specification further provides a corresponding data storage apparatus, as shown in FIG. 3.

Figure 3:
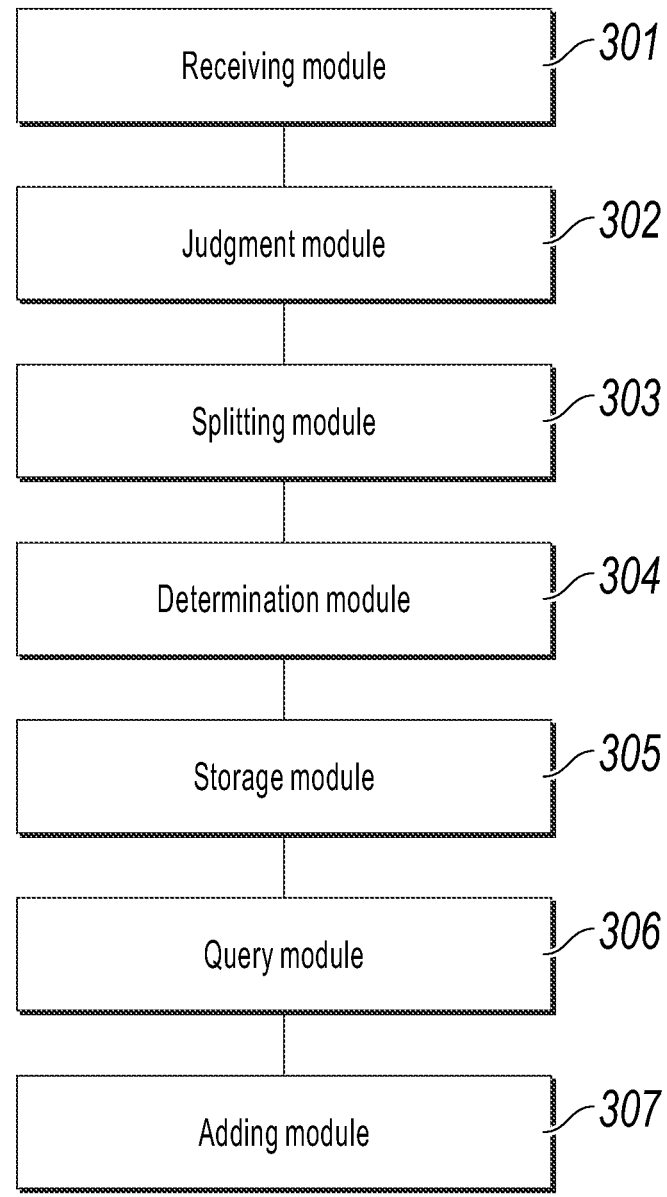
FIG. 3 is a schematic diagram illustrating a data storage apparatus, according to this specification.

FIG. 3 is a schematic diagram illustrating a data storage apparatus, according to this specification. The apparatus includes: a receiving module 301, configured to receive to-be-stored data, where the to-be-stored data include data corresponding to a plurality of fields; a judgment module 302, configured to determine whether a size of the to-be-stored data exceeds a predetermined threshold; a splitting module 303, configured to: in response to that the size of the to-be-stored data exceeds the predetermined threshold, split some data included in the to-be-stored data to obtain data blocks; a determination module 304, configured to determine block identifiers of the data blocks based on a sequence of the data blocks in the to-be-stored data; and a storage module 305, configured to correspondingly store a data identifier of the to-be-stored data and the block identifiers of the data blocks, and correspondingly store the block identifiers and the data blocks.

Optionally, the splitting module 303 is specifically configured to determine a target field from the fields included in the to-be-stored data; and split data corresponding to the target field to obtain the data blocks.

Optionally, the determination module 304 is specifically configured to determine a block sequence number corresponding to each data block based on the sequence of the data blocks in the to-be-stored data; and for each data block, determine a block identifier of the data block based on the block sequence number of the data block and the data identifier of the to-be-stored data.

Optionally, the storage module 305 is specifically configured to use the data identifier of the to-be-stored data as a key, and use a value range of the block identifiers of the data blocks as a value for corresponding storage; and for each data block, use a block identifier corresponding to the data block as a key, and use the data block as a value for corresponding storage.

Optionally, the apparatus further includes a query module 306; the query module 306 is specifically configured to receive a query request for querying data corresponding to a specified field; determine whether the specified field is the target field; in response to that the specified field is the target field, identify, based on the data identifier included in the query request, a block identifier corresponding to the data identifier from the graph database as a target block identifier; and identify a data block corresponding to the target block identifier, and identify the data corresponding to the specified field based on the identified data block.

Optionally, the apparatus further includes an adding module 307; the adding module 307 is specifically configured to: receive a data adding request, where the data adding request is used to add data to the fields included in the to-be-stored data; generate a to-be-added data block based on the to-be-added data included in the data adding request; identify, based on the data identifier included in the data adding request, a block identifier corresponding to the data identifier from the graph database; determine a block identifier of the to-be-added data block based on the identified block identifier; and correspondingly store the data identifier and the block identifier of the to-be-added data block, and correspondingly store the block identifier of the to-be-added data block and the to-be-added data block.

This specification further provides a computer-readable storage medium, where the storage medium stores a computer program, and the computer program can be used to perform the above-mentioned data storage method provided in FIG. 1.

Figure 4:
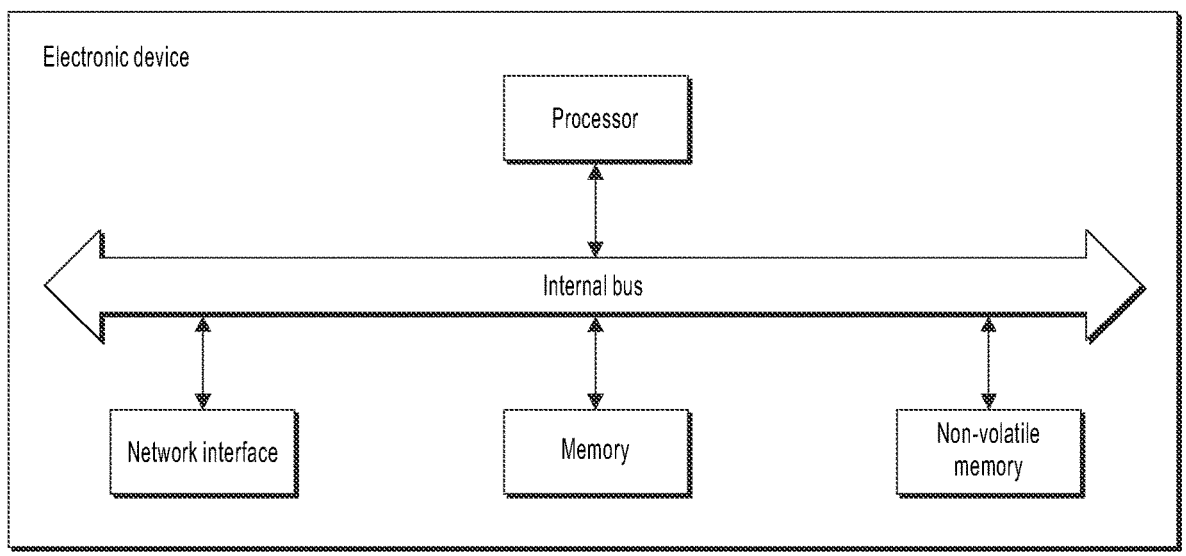
FIG. 4 is a schematic diagram illustrating an electronic device corresponding to FIG. 1, according to this specification.

This specification further provides a schematic structural diagram illustrating an electronic device corresponding to FIG. 1, as shown in FIG. 4. As shown in FIG. 4, at the hardware level, the electronic device includes a processor, an internal bus, a network interface, a memory, and a non-volatile memory, and certainly may further include other hardware needed by a service. The processor reads a corresponding computer program from the non-volatile memory to the memory and then runs the computer program to implement the above-mentioned data storage method in FIG. 1. Certainly, in addition to software implementations, this specification does not preclude other implementations, such as a logic device or a combination of software and hardware. In other words, an execution body of the following processing procedure is not limited to each logical unit, and can be hardware or a logic device.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the some described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using only the computer-readable program code, logic programming can be performed on method steps to enable the controller to implement the same function in forms of the logic gate, the switch, the application-specific integrated circuit, the programmable logic controller, the embedded microcontroller, etc. Therefore, the controller can be considered as a hardware component, and an apparatus included in the controller for implementing various functions can also be considered as a structure in the hardware component. Alternatively, the apparatus configured to implement various functions can even be considered as both a software module implementing the method and a structure in the hardware component.

The system, apparatus, module, or unit illustrated in the above-mentioned embodiments can be specifically implemented by using a computer chip or an entity, or can be implemented by using a product having a specific function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, when this specification is implemented, a function of each unit can be implemented in one or more pieces of software and/or hardware.

A person skilled in the art should understand that some embodiments of this specification can be provided as methods, systems, or computer program products. Therefore, this specification can use a form of hardware only embodiments, software only embodiments, or embodiments with a combination of software and hardware. Moreover, this specification can use a form of a computer program product that is implemented on one or more computer-usable storage media (including but not limited to a disk memory, a CD-ROM, an optical memory, etc.) that include computer-usable program code.

This specification is described with reference to the flowcharts and/or block diagrams of the method, the device (system), and the computer program product according to some embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or the another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes a persistent and a non-persistent, a removable and a non-removable medium, which can implement information storage by using any method or technology. Information can be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette tape, a cassette magnetic disk storage, or another magnetic storage device, or any other non-transmission media, which can be configured to store information that can be accessed by a computing device. Based on the definition in this specification, the computer-readable medium does not include transitory media such as a modulated data signal and carrier.

It is worthwhile to further note that, the terms "include", "comprise", or any other variant thereof are intended to cover a non-exclusive inclusion such that a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that some embodiments of this specification can be provided as methods, systems, or computer program products. Therefore, this specification can use a form of hardware only embodiments, software only embodiments, or embodiments with a combination of software and hardware. Moreover, this specification can use a form of a computer program product that is implemented on one or more computer-usable storage media (including but not limited to a disk memory, a CD-ROM, an optical memory, etc.) that include computer-usable program code.

This specification can be described in the general context of computer-executable instructions to be executed by a computer, for example, a program module. Generally, the program module includes a routine, a program, an object, a component, a data structure, etc. executing a specific task or implementing a specific abstract data type. This specification can alternatively be practiced in distributed computing environments. In the distributed computing environments, tasks are performed by remote processing devices connected through a communication network. In the distributed computing environments, the program module can be located in a local and remote computer storage medium including a storage device.

Some embodiments of this specification are described in a progressive way. For same or similar parts of some embodiments, mutual references can be made to the embodiments. Each embodiment focuses on a difference from other embodiments. Particularly, some system embodiments are briefly described since they are basically similar to some method embodiments. For related parts, references can be made to related descriptions in some method embodiments.

The above-mentioned descriptions are merely some embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification.

What is claimed is:

1. A computer-implemented method for data storage, comprising:
   receiving data to be stored, wherein the data comprise data corresponding to a plurality of fields;
   determining whether a size of the data exceeds a predetermined threshold; and
   in response to determining that the size of the data exceeds the predetermined threshold:
      determining a field in the plurality of fields that corresponds to a largest portion of the data;
      splitting the largest portion of the data to obtain data blocks;
      determining block identifiers of the data blocks based on a sequence of the data blocks;
      storing a first key-value pair, wherein a key of the first key value pair comprises a data identifier of the data, and a value of the first key-value pair comprises a range of the block identifiers; and
      storing second key-value pairs, wherein a key of a second key-value pair comprises a block identifier, and a value of the second key-value pair comprises a corresponding data block;
      storing a first portion of the data blocks and corresponding block identifiers in a graph database; and
      after a network interruption, resuming to store a second portion of the data blocks and corresponding block identifiers in the graph database.

2. The computer-implemented method of claim 1, further comprising selecting a target field from the plurality of fields, wherein the portion of the data corresponds to the target field.

3. The computer-implemented method of claim 2, wherein the computer-implemented method is applied to a graph database, and wherein the computer-implemented method further comprises:
receiving a query request for querying data corresponding to a specified field, the query request comprising the data identifier of the data;
determining whether the specified field is the target field; and
in response to determining that the specified field is the target field:
identifying, based on the data identifier of the data corresponding to the specified field, the block identifier that corresponds to the data identifier in the graph database as a target block identifier;
identifying the data block that corresponds to the target block identifier; and
identifying the data corresponding to the specified field based on the identified data block.

4. The computer-implemented method of claim 1, wherein determining the block identifiers based on the sequence of the data blocks comprises:
determining a block sequence number for each of the data blocks based on the sequence of the data blocks; and
determining each of the block identifiers based on the respective block sequence number and the data identifier.

5. The computer-implemented method of claim 1, further comprising:
receiving a data adding request that comprises data to be added to the plurality of fields and a data identifier of the data;
generating a data block based on the data;
identifying, based on the data identifier of the data, a block identifier that corresponds to the data identifier in a graph database;
determining a block identifier of the generated data block based on the identified block identifier;
storing the data identifier and the block identifier of the generated data block that correspond to each other; and
storing the block identifier of the generated data block and the generated data block that correspond to each other.

6. A non-transitory, computer-readable medium storing one or more instructions executable by a computer system to perform operations comprising:
receiving data to be stored, wherein the data comprise data corresponding to a plurality of fields;
determining whether a size of the data exceeds a predetermined threshold; and
in response to determining that the size of the data exceeds the predetermined threshold:
determining a field in the plurality of fields that corresponds to a largest portion of the data;
splitting the largest portion of the data to obtain data blocks;
determining block identifiers of the data blocks based on a sequence of the data blocks;
storing a first key-value pair, wherein a key of the first key value pair comprises a data identifier of the data, and a value of the first key-value pair comprises a range of the block identifiers; and
storing second key-value pairs, wherein a key of a second key-value pair comprises a block identifier, and a value of the second key-value pair comprises a corresponding data block;
storing a first portion of the data blocks and corresponding block identifiers in a graph database; and
after a network interruption, resuming to store a second portion of the data blocks and corresponding block identifiers in the graph database.

7. The non-transitory, computer-readable medium of claim 6, wherein the operations further comprise selecting a target field from the plurality of fields, and wherein the portion of the data are data corresponding to the target field.

8. The non-transitory, computer-readable medium of claim 7, wherein the operations further comprise:
receiving a query request for querying data corresponding to a specified field, the query request comprising the data identifier of the data;
determining whether the specified field is the target field; and
in response to determining that the specified field is the target field:
identifying, based on the data identifier of the data corresponding to the specified field, the block identifier that corresponds to the data identifier in a graph database as a target block identifier;
identifying the data block that corresponds to the target block identifier; and
identifying the data corresponding to the specified field based on the identified data block.

9. The non-transitory, computer-readable medium of claim 6, wherein determining the block identifiers based on the sequence of the data blocks comprises:
determining a block sequence number for each of the data blocks based on the sequence of the data blocks; and
determining each of the block identifiers based on the respective block sequence number and the data identifier.

10. The non-transitory, computer-readable medium of claim 6, wherein the operations further comprise:
receiving a data adding request that comprises data to be added to the plurality of fields and a data identifier of the data;
generating a data block based on the data;
identifying, based on the data identifier of the data, a block identifier that corresponds to the data identifier in a graph database;
determining a block identifier of the generated data block based on the identified block identifier;
storing the data identifier and the block identifier of the generated data block that correspond to each other; and
storing the block identifier of the generated data block and the generated data block that correspond to each other.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving data to be stored, wherein the data comprise data corresponding to a plurality of fields;
determining whether a size of the data exceeds a predetermined threshold; and
in response to determining that the size of the data exceeds the predetermined threshold:
determining a field in the plurality of fields that corresponds to a largest portion of the data;

splitting the largest portion of the data to obtain data blocks;

determining block identifiers of the data blocks based on a sequence of the data blocks;

storing a first key-value pair, wherein a key of the first key value pair comprises a data identifier of the data, and a value of the first key-value pair comprises a range of the block identifiers; and storing second key-value pairs, wherein a key of a second key-value pair comprises a block identifier, and a value of the second key-value pair comprises a corresponding data block;

storing a first portion of the data blocks and corresponding block identifiers in a graph database; and after a network interruption, resuming to store a second portion of the data blocks and corresponding block identifiers in the graph database.

12. The computer-implemented system of claim 11, wherein the one or more operations further comprise:
selecting a target field from the plurality of fields, and wherein the portion of the data are data corresponding to the target field.

13. The computer-implemented system of claim 12, wherein the one or more operations further comprise:
receiving a query request for querying data corresponding to a specified field, the query request comprising the data identifier of the data;
determining whether the specified field is the target field; and
in response to determining that the specified field is the target field:
identifying, based on the data identifier of the data corresponding to the specified field, the block identifier that corresponds to the data identifier in a graph database as a target block identifier;
identifying the data block that corresponds to the target block identifier; and
identifying the data corresponding to the specified field based on the identified data block.

14. The computer-implemented system of claim 11, wherein determining the block identifiers based on the sequence of the data blocks comprises:
determining a block sequence number for each of the data blocks based on the sequence of the data blocks; and
determining each of the block identifiers based on the respective block sequence number and the data identifier.

15. The computer-implemented system of claim 11, wherein the one or more operations further comprise:
receiving a data adding request that comprises data to be added to the plurality of fields and a data identifier of the data;
generating a data block based on the data;
identifying, based on the data identifier of the data, a block identifier that corresponds to the data identifier in a graph database;
determining a block identifier of the generated data block based on the identified block identifier;
storing the data identifier and the block identifier of the generated data block that correspond to each other; and
storing the block identifier of the generated data block and the generated data block that correspond to each other.

* * * * *